H. L. M. J. BENARD.
FLASH LIGHT FOR AERIAL NAVIGATION.
APPLICATION FILED MAY 22, 1919.

1,337,880.

Patented Apr. 20, 1920.
2 SHEETS—SHEET 1.

Inventor:
Henri L. M. J. Benard.
by Wilkinson & Giusta
Attorneys.

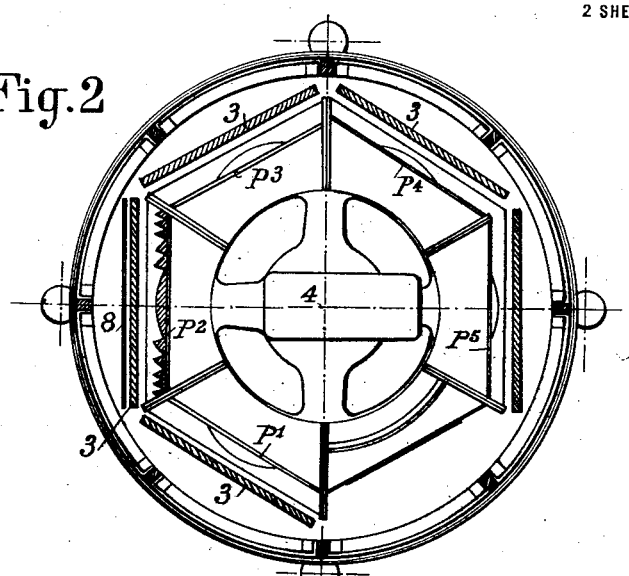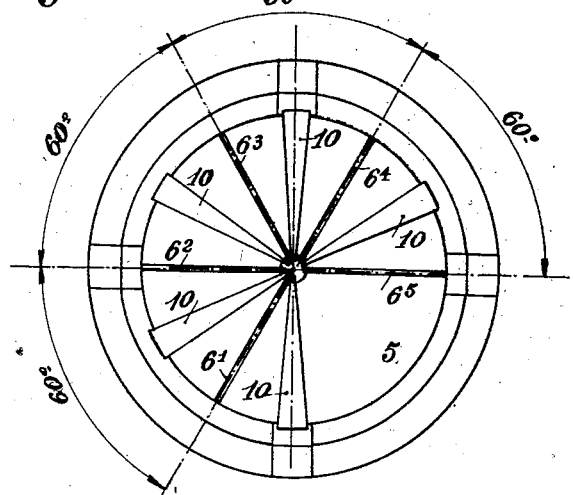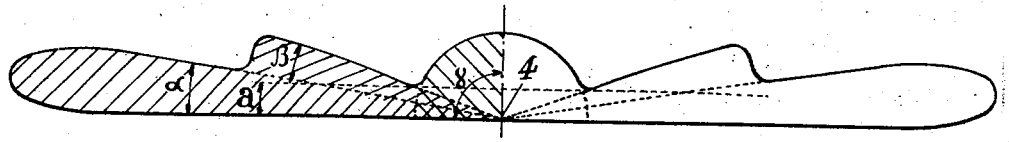

UNITED STATES PATENT OFFICE.

HENRI LUGLIEN MARIE JOSEPH BENARD, OF PARIS, FRANCE.

FLASH-LIGHT FOR AERIAL NAVIGATION.

1,337,880.　　　　　Specification of Letters Patent.　　Patented Apr. 20, 1920.

Application filed May 22, 1919. Serial No. 298,991.

*To all whom it may concern:*

Be it known that I, HENRI LUGLIEN MARIE JOSEPH BENARD, a citizen of the Republic of France, residing at 82 Rue Curial, Paris, France, have invented new and useful Improvements in and Relating to Flash-Lights for Aerial Navigation, of which the following is a specification.

In the case of signal lights which are to be visible at long distances, the use of a source of light of great intensity and of very small volume, such as an electric arc, would appear to be the ideal solution. At the same time, though a source of light of this sort has the advantage of having great intensity at the focus of the apparatus, in view of its small dimensions, there results a low divergence, which, though sufficient in the horizontal plane, is totally insufficient in the vertical plane for the flash to be seen at the different altitudes to which air-craft attain, which are, as a general rule, between 100 and 4000 meters.

The present invention relates to a flash-signaling apparatus of very great intensity, which, in consequence of the addition of a device having prismatic elements and the addition of an auxiliary light, has the advantage of giving flashes extending from the horizon to the zenith of the apparatus.

The invention consists, furthermore, in an apparatus comprising the combination of an optical system, of additional lenticular elements, of an auxiliary light and of screens.

By means of this arrangement of the system, the advantage is gained that, independently of the flashes extending from the horizon to the zenith, it is possible to produce flashes of varying characteristics, according to the manner in which the screens are grouped.

In the accompanying drawing, Figure 1 represents as a whole, in vertical section, an apparatus answering the conditions stated above.

Fig. 2 is a horizontal section.

Figs. 3, 4 and 5 show details of the hemispherical drum.

Fig. 6 is a curve showing the range of the beam of light given out by the apparatus in a vertical plane.

Figure 1:
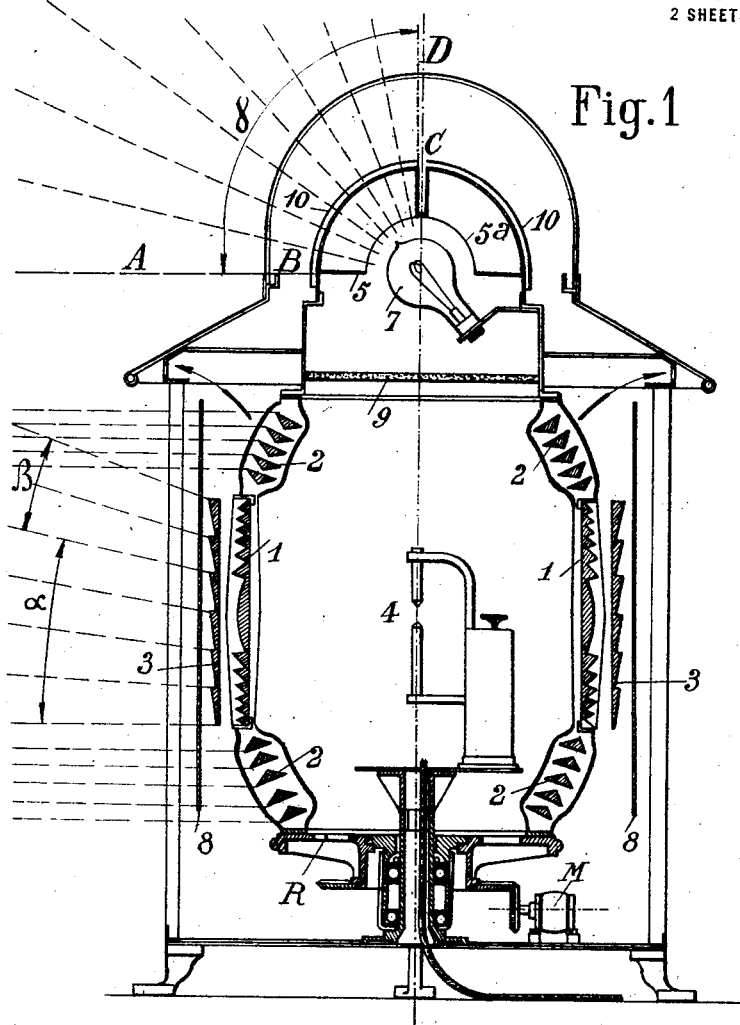

The apparatus forming the subject of this invention comprises essentially, Fig. 1, a flash-light optical system composed of dioptric elements 1 and of catadioptric elements 2, and comprising similar panels which we will suppose, for example, to be five in number $P_1$, $P_2$, $P_3$, $P_4$, $P_5$, Fig. 2, each subtending a horizontal angle of 60 degrees. In front of the dioptric portion of each panel is placed a device having prismatic elements 3. At the focus of the optical system is placed a source of light which we will suppose to be constituted, in this case, by an electric arc 4.

Figure 4:
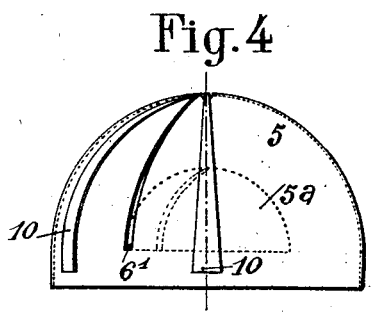
Figure 5:
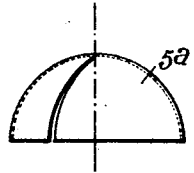

The optical system carries, at its upper portion, a hemispherical drum 5 having five apertures $6_1$, $6_2$, $6_3$, $6_4$, $6_5$, arranged as shown in Figs. 3 and 4. The axes of these apertures are set at 60 degrees one to another and are situated in the same plane as the axes of the panels $P_1$, $P_2$, $P_3$, $P_4$, $P_5$.

Within this drum is situated another hemispherical drum $5^a$ having apertures placed in the same plane as the apertures in the drum 5. The combination of the two apertured drums has the effect of limiting the breadth of the pencils of light extending from the horizon to the zenith of the apparatus.

An auxiliary light 7, in this case an electric lamp having an incandescent filament, is placed in such a manner that the axis of the luminous portion is situated in the axis of the apparatus and in the center of the drum 5. An asbestos partition 9 protects the said lamp from the heat given off by the electric arc.

The whole of the optical system rests upon a plate R to which a rotary movement is given by a motor M.

Each of the pencils of light given out by the panels $P_1$, $P_2$, $P_3$, $P_4$, $P_5$ can be masked when desired by means of movable screens 8. In the same way, the apertures of the drum 5 can be obturated by means of a register 10.

The method of operation is the following: In the panel $P_2$, for example, the light received by the catadioptric elements 2 is concentrated in the horizontal direction. The parallel beam given by the dioptric lens 1, in passing through the prismatic elements 3, is deviated in such a manner that the greater portion of the rays of light is directed into the region limited by the angle $\alpha$ which is chosen to suit requirements, the other portion of the pencil of light being distributed in the region bounded by the angle $\beta$.

In the upper portion of the apparatus, in the drum 5, the aperture $6_2$ is arranged in such a manner that the pencil of light which it allows to pass illuminates an angle $\gamma$, the ray of light A B being horizontal and the ray C D vertical. The width of the aperture is so arranged that the pencil of light shall have, in a horizontal direction, a width equal to that of the beam given by the panel of the optical system.

The total beam thus obtained has therefore the form of a pencil of light extending from the horizontal to the vertical and passing through the axis of the apparatus.

The region bounded by the angle $\alpha$ illuminated by the greater portion of the dioptric elements 1 and, moreover, reinforced in the horizontal zone by the catadioptric elements 2 and by the light emitted by the auxiliary lamp 7 is, consequently, strongly illuminated. The next region, bounded by the angle $\beta$, which is only illuminated by a portion of the dioptric elements, is of less intensity and, finally, the remaining portion illuminated by the auxiliary lamp is of an intensity equal to that of this latter.

If a curve of the ranges of the pencil of light were to be drawn, one would obtain, as regards the whole of the beam, the curve shown in Fig. 6, in which the shaded zone comprised in the angle $\alpha$ corresponds to the intensity of the pencil of light given out by a portion of the dioptric elements 1 and by the catadioptric elements 2. The shaded zone, included in the angle $\beta$, corresponds to the intensity of the pencil of light given out by another portion of the dioptric elements 1, while the shaded portion comprised in the angle $\gamma$ corresponds to the intensity of the pencil of light given out directly by the auxiliary light 7.

It will thus be seen that, in taking the case, by way of example, of an altitude of 4000 meters, to which an air-craft can rise, which height is here represented by $a$, the lowest point of the beam, the aviator will be always within the pencil of light, subject of course to the condition that his distance from the light is not superior to the horizontal range of this latter.

If none of the panels P and none of the apertures 6 of the drum 5 are masked, the apparatus would give, for one revolution, a series of five equally spaced flashes followed by one long occultation. If, on the contrary the panel $P_3$ were to be masked and the corresponding aperture $6_3$ in the drum 5 also, the characteristic of the apparatus would be for one revolution, two groups of two flashes followed by a long occultation.

In this way, by making a combination of panels, a whole series of characters can be made up.

Claims:

1. A signaling apparatus comprising in combination a source of light, a projector for the beam emitted by said source, means for amplifying said beam in the vertical plane, an auxiliary light above said first-named source of light, a drum in which said auxiliary light is mounted, said drum having apertures extending from the horizontal to the vertical plane.

2. A signaling apparatus comprising in combination a source of light, a projector for the beam emitted by said source, an auxiliary light above said first-named source of light, a hemispherical drum in which said auxiliary light is located, said drum having apertures extending from the horizontal to the vertical plane.

3. A signaling apparatus, comprising in combination a source of light, a projector for the beam emitted by said source, an auxiliary light above said first-named source of light, a pair of hemispherical drums in which said auxiliary light is mounted, said drums being concentric and having registering apertures extending from the horizontal to the vertical plane.

HENRI LUGLIEN MARIE JOSEPH BENARD.